(12) United States Patent
Pillarisetti

(10) Patent No.: US 8,972,931 B1
(45) Date of Patent: Mar. 3, 2015

(54) CONTEXTUAL VERIFICATION OF GENERATED CODE

(75) Inventor: Aravind Pillarisetti, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 657 days.

(21) Appl. No.: 13/285,845

(22) Filed: Oct. 31, 2011

(51) Int. Cl.
*G06F 9/44* (2006.01)
*G06F 9/45* (2006.01)

(52) U.S. Cl.
USPC .............................. 717/107; 703/22; 717/104

(58) Field of Classification Search
CPC ................................................ G06F 8/34–8/35
USPC ............................. 717/104, 106–107; 703/22
See application file for complete search history.

(56) References Cited

U.S. PATENT DOCUMENTS

| | | | | |
|---|---|---|---|---|
| 6,871,172 | B1 * | 3/2005 | Sanders | ........................... 703/14 |
| 7,974,825 | B2 | 7/2011 | Linebarger et al. | |
| 2007/0256053 | A1 * | 11/2007 | Torgerson et al. | ............ 717/110 |
| 2008/0098349 | A1 | 4/2008 | Lin et al. | |
| 2011/0288841 | A1 * | 11/2011 | Larsson et al. | ..................... 703/8 |

OTHER PUBLICATIONS

"Ni MATRIXx™: Getting Started Guide," National Instruments, Apr. 2007, pp. i-ix, 1-1 to 1-2, 4-1 to 4-17 and 5-1 to 5-3.

"Real-Time Workshop 7: User's Guide," The MathWorks, Inc., Sep. 2009, pp. i-xxxvi, 1-1 to 1-28, 2-1 to 2-2, 3-1 to 3-116, 4-1 to 4-24, 5-1 to 5-84, 6-1 to 6-12, 7-1 to 7-2, 8-1 to 8-4, 9-1 to 9-2, 10-1 to 10-32, 11-1 to 11-18, 12-1 to 12-30, 13-1 to 13-10, 14-1 to 14-14, 15-1 to 15-18, 16-1 to 16-6, 17-1 to 17-4, 18-1 to 18-42, 19-1 to 19-2, 20-1 to 20-12, 21-1 to 21-24, 22-1 to 22-6, 23-1 to 23-2, 24-1 to 24-34, 25-1 to 25-56, 26-1 to 26-22, 27-1 to 27-92, 28-1 to 28-8, 29-1 to 29-4, 30-1 to 30-10, 31-1 to 31-104, 32-1 to 32-30, 33-1 to 33-28, 34-1 to 34-32, 35-1 to 35-22, 36-1 to 36-70, 37-1 to 37-2, 38-1 to 38-8, 39-1 to 39-12, 40-1 to 40-6, 41-1 to 41-38, 42-1 to 42-10, 43-1 to 43-10, 44-1 to 44-6, 45-1 to 45-4, A-1 to A-4, B-1 to B-4, and Index-1 to Index-13.

* cited by examiner

*Primary Examiner* — Ryan Coyer
(74) *Attorney, Agent, or Firm* — Cesari and McKenna, LLP; Michael R. Reinemann

(57) ABSTRACT

Functional testing of computer programming code generated from an executable graphical model is performed. The model may include a plurality of graphical objects. The generated code may be stand-alone code, and may include a plurality of functions. A designation of one of the graphical objects may be received. The designated object has input/output defined graphically in the model. Meta-data mapping the designated object to one or more functions of the generated code may be created. The meta-data may also map the graphically defined input/output for the designated object to function input/output of the one or more functions of the generated code. A function interface may be generated using the meta-data that includes a call to the one or more functions, and the function input/output. During execution of the model, execution of the designated object is by-passed and the function interface and the portion of the generated code are executed.

30 Claims, 14 Drawing Sheets

META-DATA TABLE

| Inputs 708 | | | | |
|---|---|---|---|---|
| Graphical Input | Data Type 710 | Data Width 712 | Block Path 714 | Function Input 716 |
| xIn1 | double | 1 | RootModel/Subsystem 1/In1 | In4 |
| xIn2 | int32 | 1 | RootModel/Subsystem 1/In2 | In2 |
| rtIn3 | double | 3 | RootModel/Subsystem 1/In2 | bIn[0] |
|  |  |  |  | bIn[1] |
|  |  |  |  | bIn[3] |
| yIn4 | double | 1 | RootModel/Subsystem 1/In2 | cIn |

| Outputs 720 | | | | |
|---|---|---|---|---|
| Graphical Output | Data Type 722 | Data Width 724 | Block Path 726 | Function Input 728 |
| yOut4 | int32 | 3 | RootModel/Subsystem1/Out4 | xOut6[0] |
|  |  |  |  | xOut6[1] |
|  |  |  |  | xOut6[2] |
| yOut6 | double | 1 | RootModel/Subsystem1/Out6 | yOut4 |

| Data Stores 732 | | | | |
|---|---|---|---|---|
| Graphical Data Store | Data Type 734 | Data Width 736 | Block Path 738 | Function Data Store 740 |
| GlobalXP | double | 1 | RootModel/DataStoreMemory | XPT |

FIG. 7

```
154  /* Model step function */                                                                800
155  void ExampleModel_step (void)
156  {
157    /* S-Function (fncallgen) : '<Root>/Trigger' incorporates:
158     *  SubSystem: ' <Root>/Subsystem1 '
159     */
160    Subsystem1 ( ) ;  ~802
161
162    /* Outport: '<Root>/Out4 ' */                                                    812
163    ExampleModel Y. Out4 [0] = ExampleModel Subsystem1 B.fc1_j. Sum[0];
164    ExampleModel Y. Out4 [1] = ExampleModel Subsystem1 B.fc1_j. Sum[1];  ~814
165    ExampleModel Y. Out4 [2] = ExampleModel Subsystem1 B.fc1_j. Sum[2];
166                                                                                      ~816
167    /* Outport : '<Root>/Out6' incorporates:
168     *   Gain: '<Root>/Gain2'
169     */
170    ExampleModel Y. Out6 = 5.0 * ExampleModel Subsystem1 B. UnitDelay1; ~818
171
172    /* Outputs for atomic SubSystem: '<Root>/Subsystem2' */
173    Subsystem2 ( ) ~804
174
175    /* end of Outputs for SubSystem: '<Root>/Subsystem2' */
176
177    /* Outport: '<Root>/Out3' */
178    ExampleModel Y.Out3 = ExampleModel Subsystem2 B.fc2_e.Gain2;
179
180    /* Outport: '<Root>/Out7' */
181    ExampleModel Y.Out7 = ExampleModel Subsystem2 B.fc2_e.fc3_1.Sum;
182
183    /* Outputs for atomic SubSystem: '<Root>/Subsystem3' */
184    enable fcn () ; ~806
185
186    /* end of Outputs for SubSystem: '<Root>/Subsystem3' */
187
188    /* Outputs for enable SubSystem: '<Root>/Subsystem4' incorporates:
189     *  EnablePort: '<S4>/Enable'
190     */
191    Subsystem4 () ; ~808
192
193    /* end of Outputs for SubSystem: '<Root>/Subsystem4' */
194
195    /* Outport: '<Root>/Out1' */
196    ExampleModel Y.Out1[0] = ExampleModel Subsystem4 B.Gain;
197    ExampleModel Y.Out1[1] = ExampleModel Subsystem4 B.Gain;
198
199    /* Outputs for trigger SubSystem: '<Root>/Subsystem5' incorporates
200     * TriggerPort: '<S5>/Trigger'
201     */
202    Subsystem5 () ; ~810
203
204    /* end of Outputs for SubSystem: '<Root>/Subsystem5 */
205
```

FIG. 8

```
56                                                                     900
57  /* Output and update for function-call system: '<Root>/Subsystem1 ' */
58  void Subsystem1 (void)
59  {
60      /* local block i/o variables */
61      real T rtb_Gain4;
62
63      /* Gain: '<S1>Gain4' incorporates:
64       * Inport: '<Root> / In1 '
65       */
66      rtb_Gain4 = 5.0 * ExampleModel U.In1; ~904
67
68      /* Outputs for atomic SubSystem: '<S1> / fc1 ' */         902
69      fc1 (&ExampleModel U.In3[0], rtb_Gain4, &ExampleModel Subsystem1 B.fc1_ j,
70          &ExampleModel Subsystem1 DW.fc1_j) ;
71
72      /* end of Outputs for SubSystem: '<S1> / fc1 ' */
73
74      /* UnitDelay: '<S1>/ Unit: Delay1' */
75      ExampleModel Subsystem1 B.UnitDelay1 =
76          ExampleModel Subsystem1 DW.UnitDelay1_DSTATE;
77
78      /* Update for UnitDelay: '<S1>/ Unit: Delay1 ' incorporates:
79       *    DataStoreRead: '<S1>/DSR1 '
80       */
81      ExampleModel Subsystem1 DW.UnitDelay1_DSTATE = EXP GLOBAL; ~906
82  }
83
84  /* Initialize for function-call system: '<Root>/Subsystem1' */
85  void Subsystem1_initialize (void)
86  }
87      (void) memset ((void *) &ExampleModel Subsystem1 B, 0,
88              sizeof (rtB Subsystem1 ExampleModel));
89      (void) memset ((void *) &ExampleModel Subsystem1 DW, 0,
90              sizeof (rtDW Subsystem1 ExampleModel));
91  }
92
```

FIG. 9

```
27                                                                          1000
28    /* Output and update for atomic system: '<SI>/fc1' */
29    void fc1 (const real T rtu_In1 [3], real T rtu_In2, rtB fc1 ExampleModel *localB,
30                rtDW fc1 ExampleModel *localDW)
33    {
32      /* DataStoreWrite: '<S6>/Data Store Write' incorporates:
33       *    UnitDelay: '<S6>/Unit Delay'
34       */
35      SS EXP GLOBAL = localDW->UnitDelay_DSTATE;
36
37      /* Gain: ' <S6>/Gain1' * /
38      localB->fc2_signal = 3.0 * rtu_In2;  ~ 1004
39
40      /* Sum: '<S6>/Sum' incorporates:
41       *    Gain: '<S6>/Gain'
42       *    UnitDelay: '<S6>/Unit Delay'
43       */
44      localB ->Sum[0] = (3.0 * rtu_In1[0] + localB ->fc2_signal) +
45          localDW->UnitDelay_DSTATE;
46      localB ->Sum[1] = (3.0 * rtu_In1[1] + localB ->fc2_signal) + ~ 1002
47          localDW->UnitDelay_DSTATE;
48      localB->Sum[2] = (3.0 * rtu_Inl[2] + localB->fc2 signal) +
49          localDW->UnitDelay_DSTATE;
50
51      /* Update for UnitDelay: ' <S6>/Unit Delay' incorporates:
52       * DataStoreRead: '<S6>/Data Store Read1'
53       */
54      localDW->UnitDelay_DSTATE = SS EXP GLOBAL;
55    }
```

FIG. 10

```
72  /* ============================================================
73   Test Interface for Subsystem: '<Root>/Subsystem1'
74   '<Root>/Subsystem1' <==> ExampleModel/Subsystem1
75  ============================================================
76   Inports: (passed as arguments to test interface output function)
77   Argument Name   Data Type    Width   Block Path                Function Input (copied from)
78   -------------   ---------    -----   -----------               ----------------------------
79   1) rt_In2       real_T        1     '<Root>/Subsystem1/In2'   &ExampleModel_U.In1
80   2) rt_In1       const real_T  3     '<Root>/Subsystem1/In1'   &ExampleModel_U.In3 [0]
81
82   Outports: (passed as arguments to test interface output function)
83   Argument Name   Data Type    Width   Block Path                Function Input (copied to)
84   -------------   ---------    -----   -----------               ---------------------------
85   1) rt_yout4     real_T        3     '<Root>/Subsystem1/yout4'  &ExampleModel_Subsystem1_B.fc1_j.Sum[0]
86   2) rt_yout6     real_T        1     '<Root>/Subsystem1/yout6'  &ExampleModel_Subsystem1_B.UnitDelay1
87
88   Data Stores: (passed as arguments to test interface output function)
89   Argument Name                Data Type   Width   Block Path                  Data Store Memory (copied from/To)
90   -------------                ---------   -----   -----------                 ----------------------------------
91   1) rt_ds_EXP_GLOBAL           real_T      1     '<Root>/Data Store Memory'   &EXP_GLOBAL
92   2) rt_ds_SS_EXP_GLOBAL        real_T      1     '<Root>/Data Store Memory1'  &SS_EXP_GLOBAL
93  /*
94
95  void Subsystem1_Output_TestInterface(real_T rt_In2, const real_T rt_In1[3],
96    real_T rt_yout4[3], real_T *rt_yout6, real_T *rt_ds_EXP_GLOBAL, real_T
97    *rt_ds_SS_EXP_GLOBAL)
98  {
99    /* Copy test driver input arguments to actual function inputs */
100   memcpy( &ExampleModel_U.In1, &rt_In2, sizeof(real_T));
101   memcpy( &ExampleModel_U.In3[0], rt_In1, 3*sizeof(real_T));
102
103   /* Copy test driver data store arguments to data store */
104   memcpy( &EXP_GLOBAL, rt_ds_EXP_GLOBAL, sizeof(real_T));
105   memcpy( &SS_EXP_GLOBAL, rt_ds_SS_EXP_GLOBAL, sizeof(real_T));
106
107   /* Call subsystem's output code */
108   Subsystem1();
109
110   /* Copy function output values to test driver output arguments */
111   memcpy( rt_yout4, &ExampleModel_Subsystem1_B.fc1_j.Sum[0], 3*sizeof(real_T));
112   memcpy( rt_yout6, &ExampleModel_Subsystem1_B.UnitDelay1, sizeof(real_T));
113
114   /* Copy test driver data store arguments to data store */
115   memcpy( rt_ds_EXP_GLOBAL, &EXP_GLOBAL, sizeof( real_T));
116   memcpy( rt_ds_SS_EXP_GLOBAL, &SS_EXP_GLOBAL, sizeof( real_T));
117 }
118
```

FIG. 11

```
158 /* ================================================================
159    Test Interface for Subsystem: '<SI>/fc1'
160    '<SI>/fc1' <==> ExampleModel/Subsystem1/fc1
161    ================================================================
162    Inports: (passed as arguments to test interface output function)
163    Argument Name   Data Type    Width   Block Path       Function Input  (copied from)
164    --------------  -----------  ------  ---------------  ------------------------------
165    1) rt_In1       const real_T  3      '<SI>/fc1/In1'   &ExampleModel_U.In3 [0]
166    2) rt_In2       real_T        1      '<SI>/fc1/In2'   Local Signal
167
168    Outports: (passed as arguments to test interface output function)
169    Argument Name   Data Type    Width   Block Path       Function Input  (copied to)
170    --------------  -----------  ------  ---------------  ------------------------------
171    1) rt_Out1      real_T        3      '<SI>/fc1/Out1'  &ExampleModel_Subsystem1_B.fc1_j.Sum[0]
172
173    Data Stores: (passed as arguments to test interface output function)
174    Argument Name              Data Type  Width   Block Path                Data Store Memory (copied from/To)
175    ------------------------   ---------  -----   -----------------------   ----------------------------------
176    1) rt_ds_SS_EXP_GLOBAL     real_T      1      '<Root>/Data Store Memory1'  &SS_EXP_GLOBAL
177 /*
178
179
180 void fc1_1_Output_TestInterface( const real_T rt_In1[3] , real_T rt_In2, real_T
181     rt_Out1[3], real_T *rt_ds_SS_EXP_GLOBAL)
182 {
183    /* Copy test driver data store arguments to data store */
184    memcpy( &SS_EXP_GLOBAL, rt_ds SS_EXP_GLOBAL, sizeof(real_T)) ;
185
186    /* Call subsystem's output code */
187    fc1 (rt_In1, rt_In2, &ExampleModel_Subsystem1_B. fc1_j,
188          &ExampleMode1_Subsystem1_DW.fc1_j) ;
189
190    /* Copy function output values to test driver output arguments */
191    memcpy(rt_Out1, &Example_Model_Subsystem1_B.fc1_j.Sum[0], 3*sizeof(real_T)) ;
192
193    /* Copy test driver data store arguments to data store */
194    memcpy(rt_ds_SS_EXP_GLOBAL, &SS_EXP_GLOBAL, sizeof(real_T));
195 }
196
197
```

FIG. 12

CONTEXTUAL VERIFICATION OF GENERATED CODE

BRIEF DESCRIPTION OF THE DRAWINGS

The invention description below refers to the accompanying drawings, of which:

FIG. 7 is a schematic illustration of a data structure for storing meta-data in accordance with an embodiment of the present invention;

FIG. 8 is a schematic illustration of a portion of generated code for the model of FIG. 4;

FIG. 9 is a schematic illustration of a portion of generated code for the model of FIG. 4;

FIG. 10 is a schematic illustration of a portion of generated code for the model of FIG. 4;

FIG. 11 is a schematic illustration of interface code generated for a portion of the model of FIG. 4; and FIG. 12 is a schematic illustration of interface code generated for a portion of the model of FIG. 4.

DETAILED DESCRIPTION OF AN ILLUSTRATIVE EMBODIMENT

Figure 1:
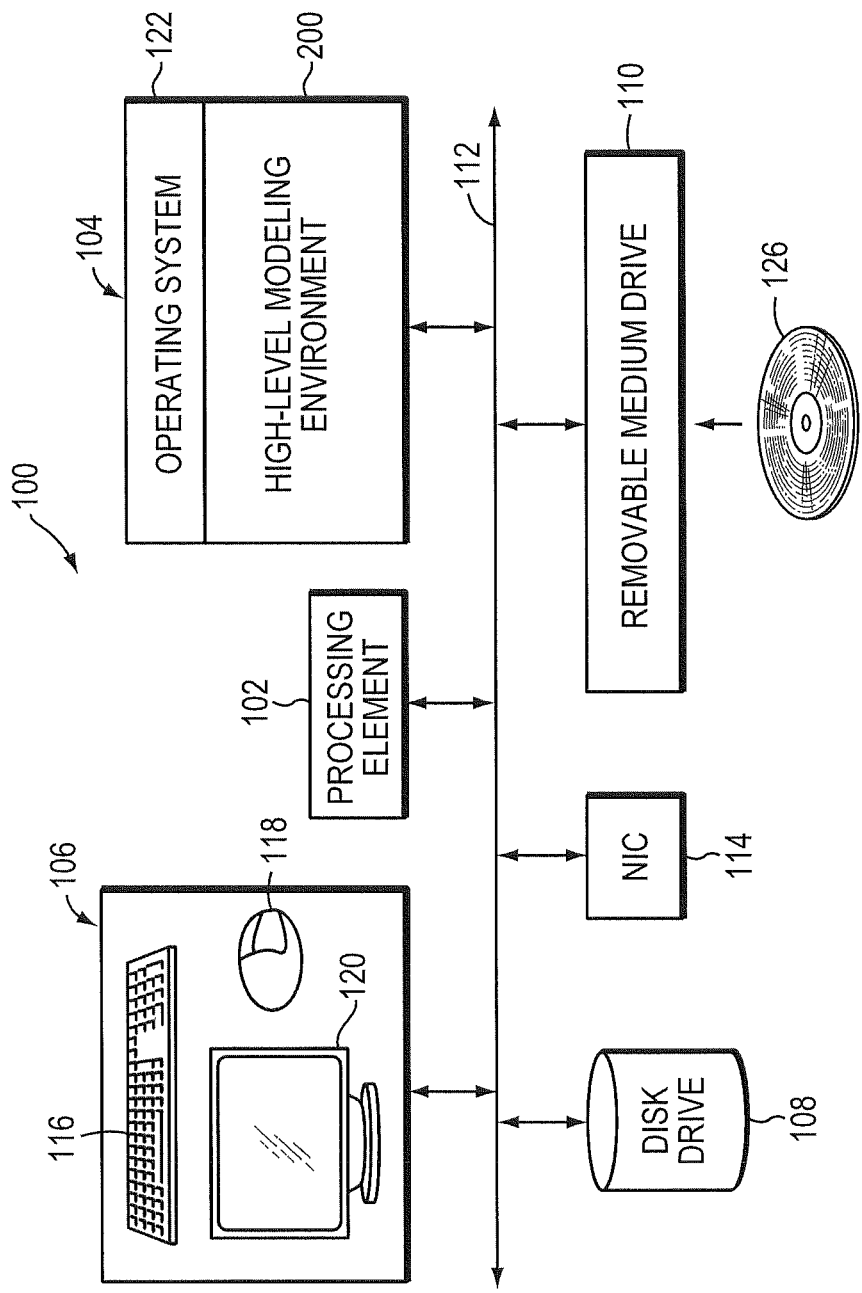
FIG. 1 is a schematic block diagram of a data processing system suitable for use with the present invention

Exemplary embodiments of the present invention may be used to evaluate one or more portions of computer programming code generated from a graphical model having executable semantics. A computer-generated, graphical model may be created within a modeling environment, such as a high-level modeling environment that provides one or more of dynamic typing, array-based operations, data type inferencing, sample time inferencing, and execution order inferencing, among other features. The model may represent a system, such as a dynamic system. A simulation engine within the modeling environment may utilize input data to execute the model, and the model may produce one or more results. The computed results may be examined by a user, for example to evaluate the model's accuracy in representing the dynamic system. The model may be constructed from a plurality of graphical objects, such as blocks. A graphical object may represent a dynamic system, a particular operation, a state, or set of operations or states. At least some of the graphical objects may be linked together, for example, by visual connections, such as arrows or wires, and the connections may represent mathematical or other relationships among the graphical objects. Groups of graphical objects may be organized into subsystems, and the model may have a plurality of hierarchically organized levels, including a top or root level.

The modeling environment may include a code generator that generates computer programming code, such as text-based source code, from the graphical model. The generated code may be standalone code that may be compiled and executed independently of the graphical model (e.g., executed on a target platform). Execution of the generated code produces the same results as the graphical model. While standalone code may be generated for the model as a whole, separate standalone code may not be created for certain parts of the model, which may be referred to as model units or just units, such as individual graphical objects and subsystems.

A given subsystem of the model may have one or more inputs and outputs that are defined and/or represented graphically in the model. Furthermore, an execution context may be defined within the graphical model for the given subsystem. The generated code may include one or more functions that implement the given subsystem, and the one or more functions may have one or more function inputs and function outputs (function IO). This function IO may not have a one-to-one correspondence with the given subsystem's graphical inputs and outputs (graphical IO). Furthermore, the function IO of the one or more functions may be dispersed throughout the generated code.

A mapping engine evaluates the code generated for the graphical model by the code generator. In an embodiment, the code generator and the mapping engine are integrated with the modeling environment, and the mapping engine monitors the code as it is generated from the model. The mapping engine determines which functions within the generated code correspond to one or more units, such as subsystems, of the graphical model. In addition, the mapping engine identifies the function IO for these functions, and may trace the function IO to corresponding inputs and outputs defined graphically in the model, referred to as the graphical IO.

The information determined by the mapping engine, which correlates functions of the generated code to one or more model units, for example, subsystems, and correlates graphical IO to function IO, may be referred to as meta-data. The mapping engine may store the meta-data in one or more data structures, such as tables or files, and may store the one or more data structures in a meta-data store. A report generator may access the one or more meta-data stores, and produce a report identifying the functions of the generated code that correspond to one or more model units, e.g., subsystems. The report may be output for access by a user. The mapping engine may also annotate at least a portion of the generated code with meta-data.

An interface generator may interoperate with the mapping engine (or it may access the one or more meta-data stores) to identify the one or more functions in the generated code that implement the given model unit, e.g., subsystem. The interface generator may also identify the function IO of the generated code that maps to the graphical IO of the model. In addition, the interface generator may identify one or more additional functions in the generated code that may need to be run before or after the one or more identified functions based on the execution context of the given subsystem, and may identify the function IO of these one or more additional functions. The interface generator may utilize this information to construct an interface function for the one or more functions of the generated code that implement the given subsystem. The interface function, which may also be referred to as contextual code, may include calls to the one or more functions and to the one or more additional functions, and may also include the function IO for these functions. The interface function may be included in a source file.

A bypass engine may interoperate with the simulation engine in order to functionally test one or more selected portions of the generated code during execution of the graphical model within the context of the graphical model. In particular, the bypass engine may receive a designation of the given subsystem or some other portion of the model. The graphical model may then be executed and, each time model execution reaches the given subsystem, the bypass engine may suspend execution of the graphical model, and may switch execution over to the one or more functions of the generated code that correspond to the given subsystem, and to the one or more additional functions. Specifically, the bypass engine may access the interface function generated by the interface engine. The bypass engine may translate graphical input values computed during model execution into function input values. The bypass engine may then cause the one or more functions within the generated code that correspond to the given subsystem to execute. The bypass engine may further cause the one or more additional functions of the generated code that are necessary for the execution of the one or more functions to be executed.

Additionally, the bypass engine may translate one or more function output values computed during execution of the generated code portion into graphical outputs as specified in the interface function. The simulation engine may access the graphical outputs translated from the function output computed during execution of the generated code portion, and resume execution of the graphical model utilizing these translated values.

Significantly, the bypass engine permits the contextual verification of a portion of the code that was generated for the graphical model within the execution context of the model itself. That is, the bypass engine permits the modeling environment to switch between execution of the graphical model, and execution of a portion of the code generated for the graphical model. The locations within the graphical model at which a switch is made to a part of the generated code may be selected by a user. Specifically, the user may designate one or more portions of the graphical model, such as one or more subsystems, for contextual verification.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Exemplary processing elements include single or multi-core Central Processing Units (CPUs), Graphics Processing Units (GPUs), Field Programmable Gate Arrays (FPGAs), Application Specific Integrated Circuits (ASICs), etc. Other pointing devices may include touchpads and touchscreens, among others.

The main memory 104 may store a plurality of libraries or modules, such as an operating system 122, and one or more applications running on top of the operating system 122, including a modeling environment 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers, smart phones, electronic readers, and other portable computing devices, etc. Nonetheless, those skilled in the art will understand that the computer system 100 of FIG. 1 is intended for illustrative purposes only, and that the present invention may be used with other computer systems, data processing systems, or computational devices. The present invention may also be used in a networked, e.g., client-server, computer architecture, or a public and/or private cloud computing arrangement.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating systems, among others.

As indicated above, a user or developer, such as an engineer, scientist, programmer, etc., may utilize one or more input devices, such as the keyboard 116, the mouse 118, and the display 120 to operate the modeling environment 200, and construct one or more models of a system that is being designed. The models may be computational and may have executable semantics. In particular, the models may be executable. The execution of a model may simulate the system that is being designed.

In an embodiment, the modeling environment 200 is a high-level modeling environment. Suitable high-level modeling environments include the MATLAB® and Simulink® technical computing environments from The MathWorks, Inc. of Natick, Mass., the Stateflow charting tool from The MathWorks, Inc., the LabVIEW programming system from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator System from Xilinx, Inc. of San Jose, Calif., and the graphical modeling system described in U.S. Pat. No. 7,324,931 for Conversion of Model Components Into References, which is hereby incorporated by reference in its entirety, among others. Models created in the high-level modeling environment may contain less implementation detail, and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The Simulink® technical computing environment is a graphical, block-based, model-based design environment for modeling and simulating dynamic systems, among other uses. The MATLAB and Simulink tools provide a number of high-level features that facilitate algorithm development and exploration, and support model-based design. Exemplary high-level features include dynamic typing, array-based operations, data type inferencing, sample time inferencing, and execution order inferencing, among others.

Figure 2:
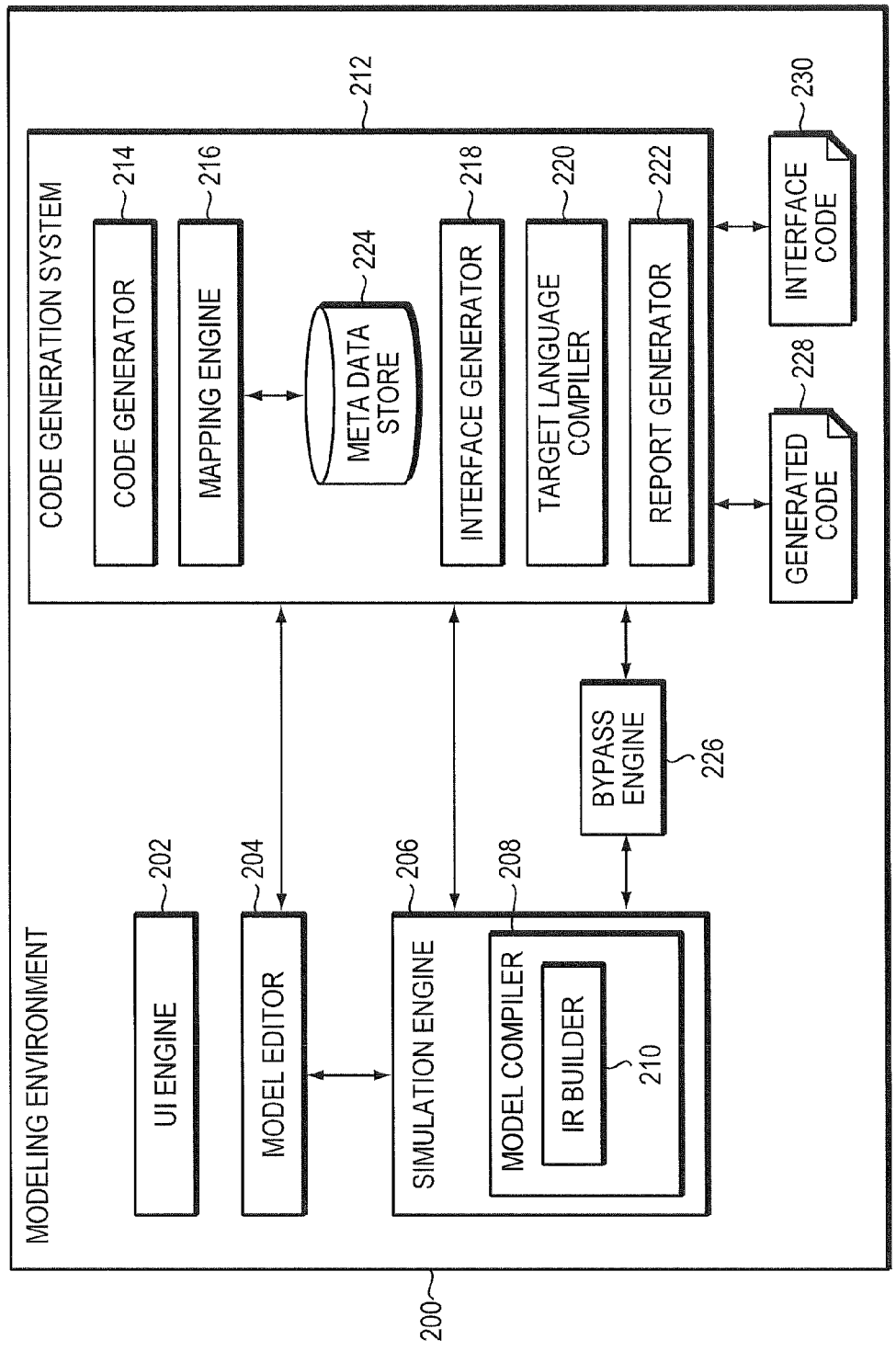
FIG. 2 is a partial functional diagram of a modeling environment in accordance with an embodiment of the present invention.

FIG. 2 is a partial block diagram of an embodiment of the modeling environment 200. The environment 200 may include a user interface (UI) engine 202, and a model editor 204, and a simulation engine 206. The simulation engine 206 may include a model compiler 208 that, in turn, may include one or more Intermediate Representation (IR) builders, such as IR builder 210.

In an embodiment, a system 212, such as a code generation system, is integrated with the modeling environment 200. For example, the code generation system 212 may be implemented as an add-on tool to the environment 200, or it may be built-into the environment 200, among other options. Alternatively, the code generation system 212 may be separate from the modeling environment 200, but in a communicating relationship with it.

The code generation system 212 may include a plurality of components or modules. In particular, it may include a code generator 214, a mapping engine 216, an interface generator 218, a target language compiler 220, and a report generator 222. The system 212 may also include or have access to one or more meta-data stores, such as meta-data store 224. The code generation system 212 or the modeling environment 200 may further include a bypass engine 226. The code generation system 212 may produce generated code, such as generated code 228, and interface code, such as interface code 230. The generated code 228 may be in the form of source code, such as a plurality of build files, such as main files, header files, source files, make files, etc. Alternatively or additionally, the generated code 228 may be in the form of object code, such as one or more executables. The object code may be created by compiling the generated source code, for example, by the target language compiler 220.

In an embodiment, the modeling environment 200 may receive inputs by a user as the user creates, edits, revises, and/or opens one or more models, which may be stored in main memory 104 or persistent memory 108. For example, the user may select a plurality of graphical objects, such as icons or blocks, from one or more libraries or palettes of pre-defined objects, and place the selected objects onto a model canvas that may be managed by the model editor 208. The user also may employ a connection tool to establish connections among the blocks, which may or may not be visually represented on the model canvas. The graphical objects of the model may represent dynamic systems, computations, functions, operations, or states, and the connections, which may appear as wires or arrows, among the objects may represent data, control, signals, events, or mathematical relationships among those dynamic systems, computations, functions, operations, or states. The model may be a Simulink model, a Stateflow chart, a LabVIEW block diagram, a VEE diagram, a MATLAB file, a MatrixX model, etc. The model may represent a dynamic system, such as an aircraft flight controller, an engine control unit (ECU), an embedded system, etc. The simulation engine 206 may simulate the modeled system, e.g., it may execute the model.

In particular, the UI engine 202 and model editor 204 may provide or support a graphical user interface (GUI) that includes the model canvas for displaying a graphical model. The GUI may also include a plurality of command buttons, including a Run button, that may be selected by the user. The UI engine 202 may also provide or support a Command Line Interface (CLI) that may receive a text-based run command entered by the user. In response to the user selecting the Run button or entering the run command, the simulation engine 206 may execute or simulate the graphical model, and may output the results produced by the model's execution, for example, to the user via the display 120.

The UI engine 202 may also provide or support a Code Generation button in the GUI that may be selected by the user, or the UI engine 202 may receive a code generation command entered by the user, e.g., in the GUI or the CLI. In response to the user selecting the Code Generation button or entering the code generation command, the code generator 214 may generate code for the model, and may store the generated code in memory. The code generation command also may be invoked programmatically, for example, when a particular event occurs, such as a model passing verification, etc. In an embodiment, the generated code may be textual code, such as textual source code, that may be compiled and executed on a target machine or device. The generated code may conform to one or more programming languages, such as C, C++, C#, SystemC, VHDL, Verilog, embedded MATLAB, Structured Text, vendor or target specific HDL code, such as Xilinx FPGA libraries, etc.

In an embodiment, for one or more components of the model, the code generator 214 may generate code that adheres to a documented interface. Furthermore, the code generator 214 may be configured, for example by the user, to generate a user-specified interface. A component may refer to the top-level model and any sub-models within the top-level model. A unit may refer to a subsystem or a block of a model or sub-model. For each unit inside a component of the model, the code generator 214 may generate a contextual interface. This contextual interface may be determined by evaluating the context of the unit inside the component, such as the dimension and type of the unit's input and/or output data, sampling rate, sampling mode, such as sample-based or frame-based, etc. The code generator 214 may determine a unit's contextual interface by considering: the graphical context of the unit inside the component, the execution context of the unit inside the component, component data accessed by the unit, user-specified code generation optimizations, and code generator optimizations. A unit's execution context may include the execution order of the unit inside the component code, and a context/call-stack of the unit's function. By contrast, the interface of a component may be non-contextual. Furthermore, while the code generated for a model as a whole may be executed, it may not be possible to execute a portion of the generated code. It also may be difficult to even identify the portion of the generated code that corresponds to a particular unit or other part of the model through a visual inspection of the generated code.

Suitable code generators include the Simulink Coder, Embedded Coder, and Simulink HDL Coder products from The MathWorks, Inc., and the system described in U.S. Pat. No. 7,974,825 for Generation of Code from a Graphical Model, which is hereby incorporated by reference in its entirety.

A suitable mapping engine is described in U.S. Patent Publication No. 2008/0098349 for Traceability in a Modeling Environment, which is hereby incorporated by reference in its entirety.

The code generator 214, mapping engine 216, interface generator 218, target language compiler 220, report generator 222, and bypass engine 226 may each comprise registers and/or combinational logic configured and arranged to produce sequential logic circuits. In an embodiment, the code generator 214, mapping engine 216, interface generator 218, target language compiler 220, report generator 222, and bypass engine 226 may be implemented through one or more software modules or libraries containing program instructions pertaining to the methods described herein. The software modules may be stored on main memory 104 and/or other non-transitory computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention.

The meta-data store 224, the generated code 228, and the interface code 230 may be implemented through files, tables, trees, or other data structures.

Figure 3A:
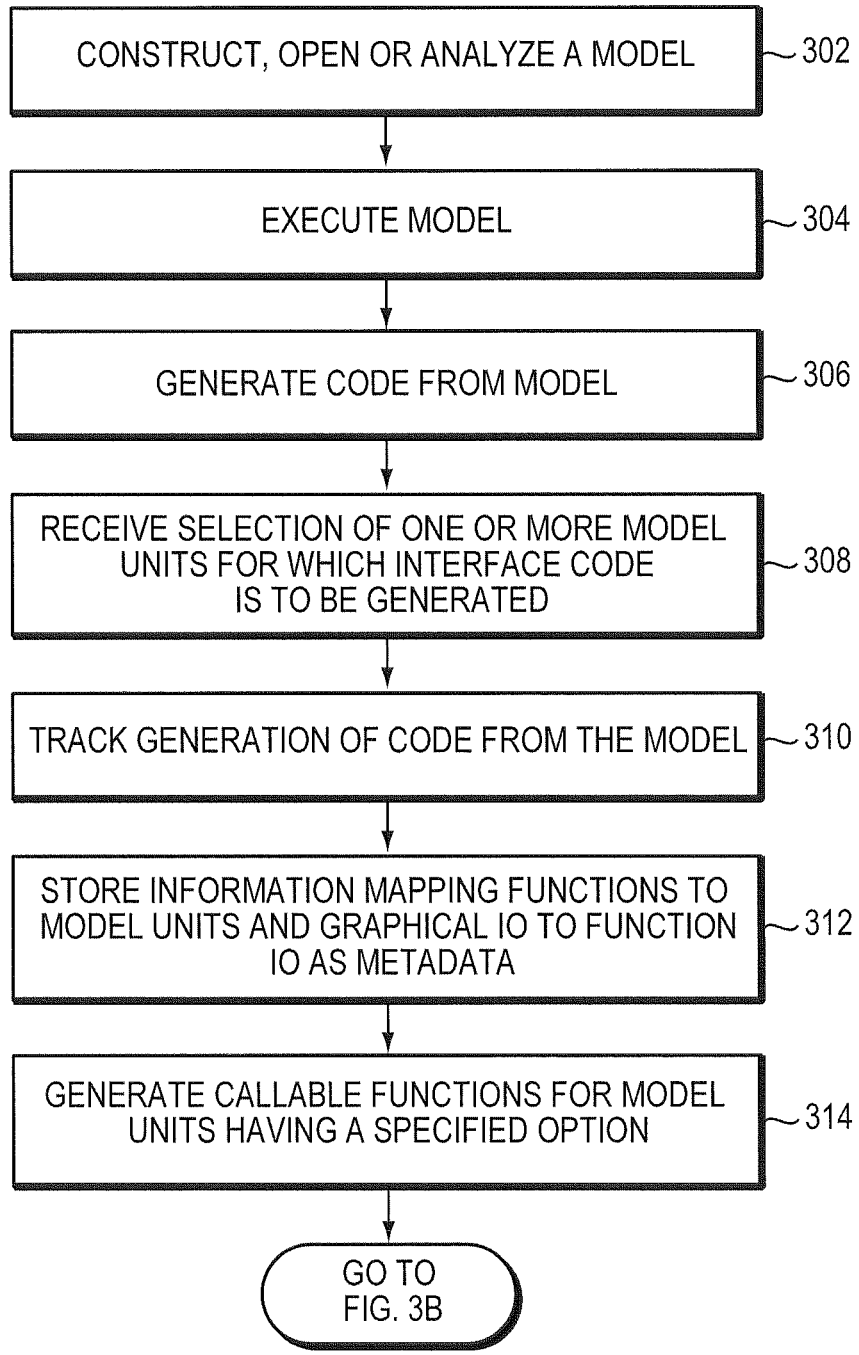
FIGS. 3A-C is a flow diagram of a method in accordance with an embodiment of the present invention
Figure 3B:
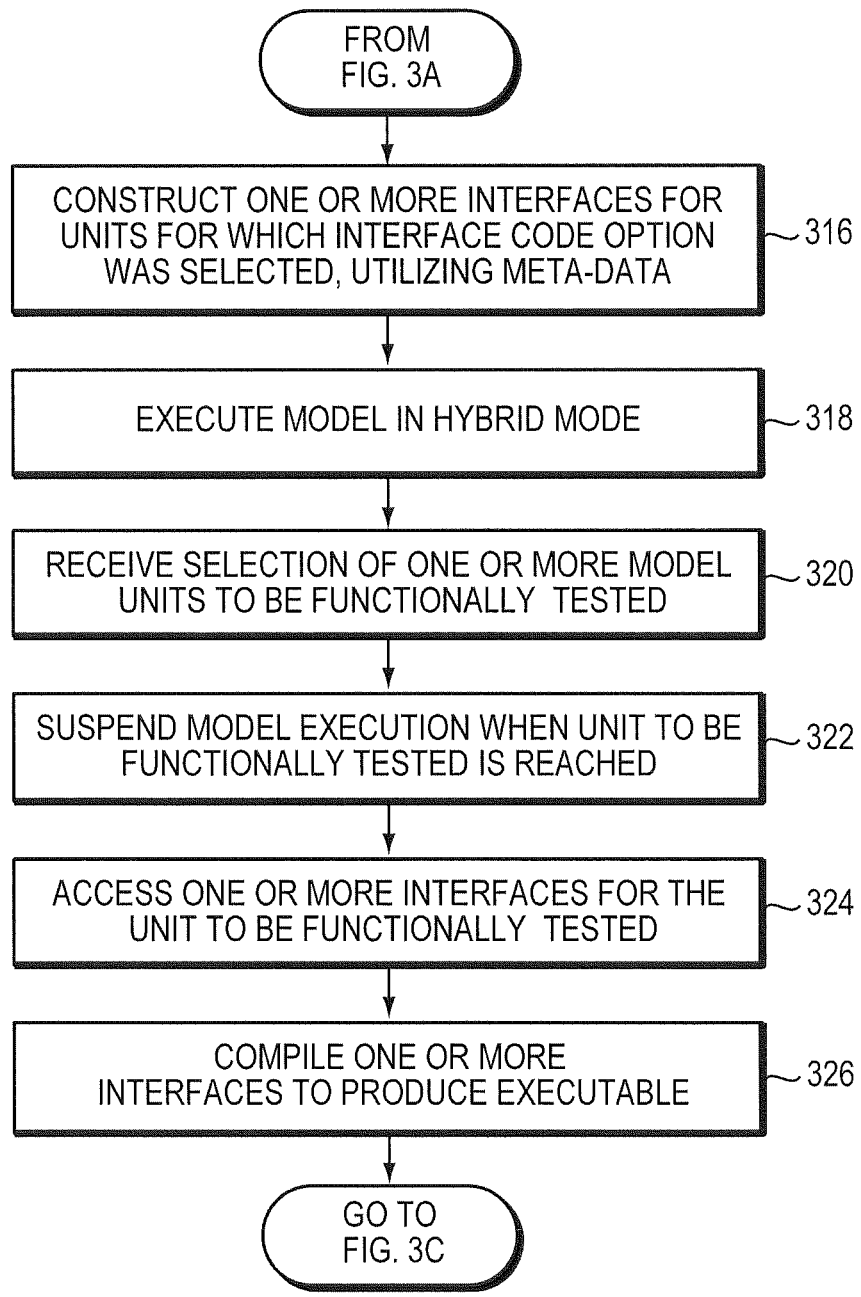
Figure 3C:
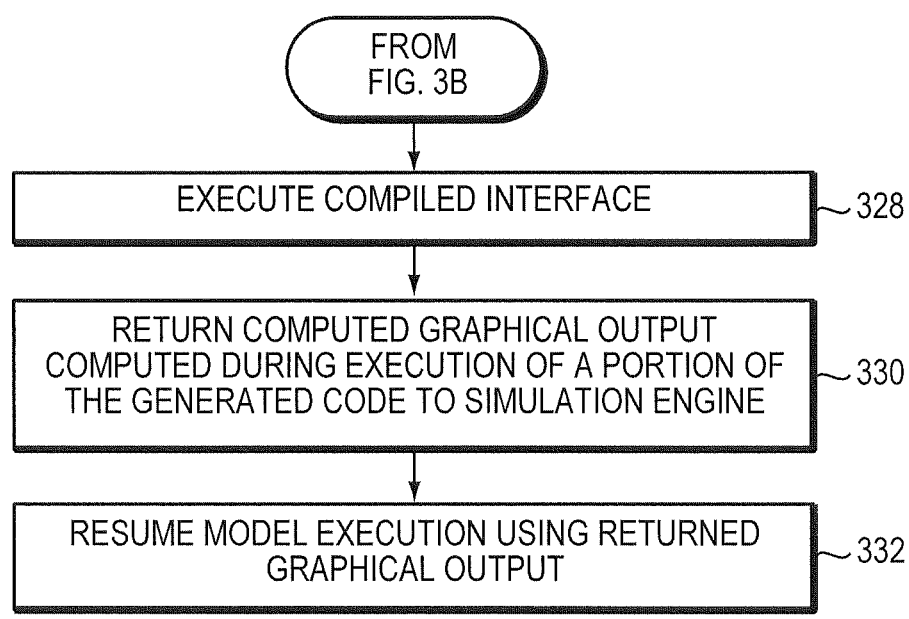

FIGS. 3A-C is a flow diagram of a method in accordance with an embodiment of the invention. The modeling environment 200 may receive inputs from a user constructing, analyzing, or opening a model, as indicated at block 302. Environment 200 may support the creation of graphical, text-based, or a combination of graphical and text-based models. The user may operate and interact with environment 200 through the user I/O 106, such as the keyboard 116, mouse 118, and display 120. For example, the UI engine 202 may present an editor on the display 120. The editor may include a menu bar, a tool bar, a canvas, and one or more palettes of available blocks. The user may select one or more graphical objects, such as blocks, from one or more palettes, place them on the canvas, and connect them, e.g., with lines, such as arrows, thereby establishing mathematical or other relationships among the blocks. Pre-defined graphical objects include Filter blocks, Transformation blocks, such as Fast Fourier Transform (FFT) and Discrete Cosine Transform (DCT) blocks, Correlation blocks, code blocks, such as the Embedded MATLAB block from The MathWorks, Inc., etc. In response to the user inputs, the model editor 204 may build a model that may be presented to the user, for example, on the display 120.

The graphical model may be executed by the simulation engine 206, as indicated at block 304. For example, a user may select the Run button presented by the UI engine, or enter a text-based command. A model may also be executed programmatically. Model execution may include a compile stage, a link stage, and a simulation loop stage. The compile and link stages may be performed by the model compiler 208 of the simulation engine 206. The compile stage may involve preparing data structures and evaluating parameters, configuring and propagating block characteristics (e.g., sample times, data types, etc.), determining block connectivity, performing block reduction and block insertion, and generating a sorted order of the equations corresponding to the individual blocks of the model. One or more in memory representations, such as intermediate representations (IRs), may be generated for the model by the IR builder 210. The link stage may involve memory allocation, and generation of a block method execution list from the sorted order. During the simulation loop stage, the compiled and linked version of the model may be directly utilized by the simulation engine 206 to execute the model in an interpreted mode.

In an embodiment, at least one of the IRs may be in the form of a hierarchical, Data Flow Graph (DFG) having a plurality of nodes interconnected by edges. The nodes of the IR may represent blocks from the executable graphical model, the edges of the IR, called signals, may represent the connections between the blocks of the model. Special nodes, called network instance components (NICs), may be used to provide hierarchy in the IR, for example, by abstractly representing subsystems of the model. That is, each block or subsystem of the model may map to one or more nodes of the IR, and each line or arrow of the model may map to one or more edges of the IR.

In an embodiment, the in-memory representation may have a plurality of hierarchically arranged levels. More specifically, the IR may be a top-level of the in-memory representation of the model and one or more of the components of the IR may be a particular type or form of in-memory representation. For example, one or more components of the IR may be a Control Flow Graph (CFG), Data Flow Graph (DFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as main memory 104.

Model execution may be carried out for one or more inputs, such as a set of inputs, and may produce one or more results or outputs, such as a set of outputs. Model execution may take place over a time-span. For example, execution may begin at a start time, include one or more time steps, and end at a stop time. The start time, time steps, and end time may be logical and have no correspondence with the physical passage or time. Alternatively, the start time, time steps, and end time may have a correspondence with the physical passage or time and execution may operate in real time.

Computer programming code may also be generated from the model, as indicated at block 306. For example, a user may select a code generation command button presented by the UI engine. Alternatively, the user may enter a text command to generate code for the model. In an embodiment, before launching the code generation process for the model, one or more code generation parameters or options may be selected for the model, and one or more code generation parameters or options may be selected for one or more objects of the model, such as one or more subsystems.

For example, the UI engine 202 may present a Model Code Generation pane on the display 120. The Model Code Generation pane may include one or more options whose value may be selected by the user. A first option may specify the programming language of the code to be generated from the model, such as C, C++, C#, Ada, HDL, Structured Text, etc. Another option may specify a code generation objective, such as execution efficient, Read Only Memory efficient, Random Access Memory efficient, etc. Another option may specify the type of code to be generated, such as normal code and instrumented code. Instrumented code includes features that may, for example, make debugging the code easier enable logging of intermediate variable data, etc. Other options may specify an execution mode for the generated code, such as Processor-in-the-Loop (PiL) and Software-in-the-Loop (SiL). With PiL generated code is executed by a test platform that may include one or more target hardware elements and Instruction Set Simulators. Code for an algorithmic portion of the model may be generated and executed by the one or more target hardware elements, while code for an environmental portion of the model may be generated and executed by a simulator such as a real-time simulator (e.g., in a Hardware-in-the-Loop, or HiL, configuration). With SiL, code that emulates a specified target is generated, but the code may be run on a host machine, which emulates the execution behavior of the target. For example, a user may specify a 16-bit Digital Signal Processor (DSP) as the target, but with the SiL option the generated code may be executed on a 32-bit host processor, such as the processor in a workstation.

In addition, the UI engine 202 may present a Subsystem Code Generation pane on the display for a selected subsystem of the model. The Subsystem Code Generation Pane may be presented in response to a user selection of a subsystem, e.g., with the mouse 118. The Subsystem Code Generation pane may include one or more user-settable or programmable options. The particular value of a settable option may control the way in which code is generated for that subsystem. For example, for subsystems that have been declared to be atomic, the Subsystem Code Generation pane may include a Function Packaging option, which may be set to one of a plurality of available values, which may correspond to Inline, Function, Reusable Function, and Auto. If the Inline value is selected, the code generator 214 may inline code generated for the subsystem within the code generated for model, for example, within a primary source file. If the Function value is selected, the code generator 214 may create a separate function with no arguments for the subsystem, and may place this separate function in a separate file within the generated code. The function may thus operate on global data. If the Reusable Function value is selected, the code generator 214 may create a function with arguments, thereby allowing the created function to be shared at other points within the model. A reusable function may have data passed to it as arguments. If the Auto value is selected, the code generator 214 may determine whether to inline the code or create a separate function, based on one or more characteristics, such as whether the subsystem occurs more than once in the model.

Even though the code generator 214 may be directed to generate one or more separate functions for a particular subsystem, the one or more functions and the function IO corresponding to these one or more functions may be distributed throughout the code generated for the model, which may extend for hundreds or even thousands of lines of code.

The user may also select one or more units of the model for which interface code is to be generated, as indicated at block 308. For example, a user may identify one or more subsystems of the model for which interface code is to be generated. The selected subsystems may be identified before code is generated for the model. The one or more subsystems may be identified by selecting an interface code option in the Subsystem Code Generation pane for the subsystem. Alternatively, the option may be specified through a text-based command. A user may request that interface code be generated for all of the subsystems of the model, for example, through an option on the Model Code Generation pane.

Code generation may include a compile stage and a link stage, as described above. The compiled and linked version of the model may be translated into code conforming to the syntax and semantics of the specified target language. The generated code may be in the format of the designated target language, e.g., C, C++, C#, Ada, HDL, Structured Text, etc. Alternatively or additionally, the generated code may be in the form of object code or machine instructions, such as an executable, suitable for execution by a target device, such as a central processing unit, a microprocessor, a digital signal processor, etc. The generated code may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others.

As the code is generated from the model, the mapping engine 216 may track, e.g., monitor, the code generation process, as indicated at block 310. In particular, the mapping engine 216 may determine which portions of the generated code trace back to the objects, subsystems, and other elements of the model. For example, the mapping engine 216 may determine which functions, objects, or statements of the generated code implement the objects, subsystems or other elements of the model for which the generate interface code option was selected. The mapping engine 216 also may determine which input and output arguments, variables, or other values within the generated code implement graphically defined inputs, outputs and other values, such as variables. The mapping engine 216 may designate this information as meta-data, and may store the meta-data derived for the generated code in the meta-data store 224, as indicated at block 312.

As part of the code generation process, the code generator 214 may generate a plurality of code modules, such a model header file (model.h), a model source file (model.c), and one or more header and source files for one or more non-inlined portions of the model, such as non-inlined subsystems. Header files may define data types, data structures, and macros required by the generated code. For example, model.h may declare model data structures and a public interface to the model entry points and data structures. For each subsystem of the model for which the code generating parameter was set to the "Function" or the "Reusable Function" value, the code generator 214 may create a separate callable function, and may store generated code for the callable function in one or more header and source files, as indicated at block 314. Nonetheless, these separate header and source files may not be independent of the top-level files (model.h and model.c) generated for the model. For example, a file generated for a subsystem may reference a global data structure.

In an embodiment, a user may create a main.c file to execute the generated code in a desired manner. Specifically, the main.c file may call top-level model functions to execute the model.

Other code modules or files may also be created such as one or more make files (model.mk), which may be used to build an executable from the source files.

The generated code may be stored in memory, such as main memory 104 or disk storage 108.

Unit Interface Generation

The interface generator 218 may construct one or more interfaces for the units of the model for which interface code was requested, as indicated at block 316 (FIG. 3B). The interface generator 218 may utilize information contained in the meta-data store 214 in constructing the one or more interfaces, as also indicated at block 316. In particular, the interface generator 218 may use the information in the meta-data store 214 to determine the one or more portions of the generated code that correspond to the one or more selected units of the model. The one or more interfaces constructed by the interface generator 218, among other things, handle translations of input data from the graphical model to data utilized by the portion of generated code, and translations of output data determined or computed by the generated code (when executed) to data utilized by the graphical model. In an embodiment, the interface may be implemented through one or more header files and one or more source files. The one or more header files may contain one more include statements and one or more type definitions (typedefs). The one or more source files may include statements for:

mapping one or more graphical inputs to the respective model element, as defined in the model, to corresponding function inputs of the generated code;

mapping one or more data store memories (DSMs) that are read in the function;

calling the one or more functions;

mapping one or more function outputs to corresponding graphical outputs of the respective model element; and mapping one or more data store memories (DSM) that are written in the function.

In an embodiment, the one or more interfaces generated for the specified units of the model may be considered to be separate from the code generated for the model. That is, the code generated for the model may be executed without executing any of the interfaces.

Hybrid Model Execution

In an embodiment, the simulation engine 206 in cooperation with the bypass engine 226 may execute the graphical model in a hybrid mode, as indicated at block 318. In particular, a user may designate a unit or a portion of the graphical model for functional testing, as indicated at block 320. The designated unit or portion of the model may be one or more subsystems for which interface code was generated by the interface generator 218. Functional testing of a unit of the model involves running a portion of the generated code for the model, where the portion of code corresponds at least to the code generated for that unit.

The simulation engine 206 executes the model, for example, as described above. When execution of the model reaches the designated model unit, further execution of the model by the simulation engine 206 is suspended, and further execution is handed off to the bypass engine 226, as indicated at block 322. For example, each time the simulation engine 226 reaches the designated model unit (or the one or more equations corresponding to the designated model unit) in the sorted order, the simulation engine 206 passes execution control to the bypass engine 226. The bypass engine 226 accesses the interface previously constructed by the interface generator 218, as indicated at block 324. The by-pass engine 226 may direct the target language compiler 220 to compile the interface to produce an executable, as indicated at block 326. The bypass engine 226 may then cause the compiled interface to be executed, as indicated at block 328 (FIG. 3C).

The bypass engine 226 may call one or more initialize functions included in the generated code for the component, for example, the model, containing the unit to be functionally tested before executing the compiled interface. By calling the one or more initialize functions, the bypass engine 226 initializes the entire code. The one or more initialize functions may only need to be called once even if multiple units are being tested during the same simulation of the model.

It should be understood that the one or more interfaces as well as the generated code for the model may be compiled before hybrid execution of the model.

Execution of the interface may result in the graphical input that corresponds to the unit being functionally tested being translated into function input of the generated code, and graphical data store memory reads to be translated to function data store memory reads. Execution of the interface may further include calls to the one or more functions of the generated code that correspond to the designated model unit. Execution of the interface may also include calls to one or more other functions of the generated code on which execution of the functions that correspond to the designated model unit depend. In addition, one or more function outputs produced during execution of the portion of the generated code may be translated to graphical output, and function data store memory writes may be translated to graphical data store memory writes. The bypass engine 226 may return the translated graphical output to the simulation engine 206, as indicated at block 330. The simulation engine 206 may resume its execution of the graphical model utilizing the graphical output returned by the by-pass engine 226, as indicated at block 332. For example, the simulation engine 206 may resume execution with the next model unit (or the one or more equations corresponding to the next model unit) in the sorted order following the designed unit, which is being functionally tested. While code is generated for the model as a whole, only a portion of the generated code may be executed during hybrid execution of the model. The entire generated code may be compiled, or only a portion of the generated code may be compiled.

In an embodiment, the simulation engine 206 may control when the bypass engine 226 is started and stopped.

The report generator 222 may be directed to generate one or more reports. For example, the report generator 22 may generate a report identifying the functions of the generated code that correspond to one or more units of the model. The one or more reports may be output by the modeling environment 200, for example, the reports may be presented on the display 120, printed, or saved to memory.

Figure 4:
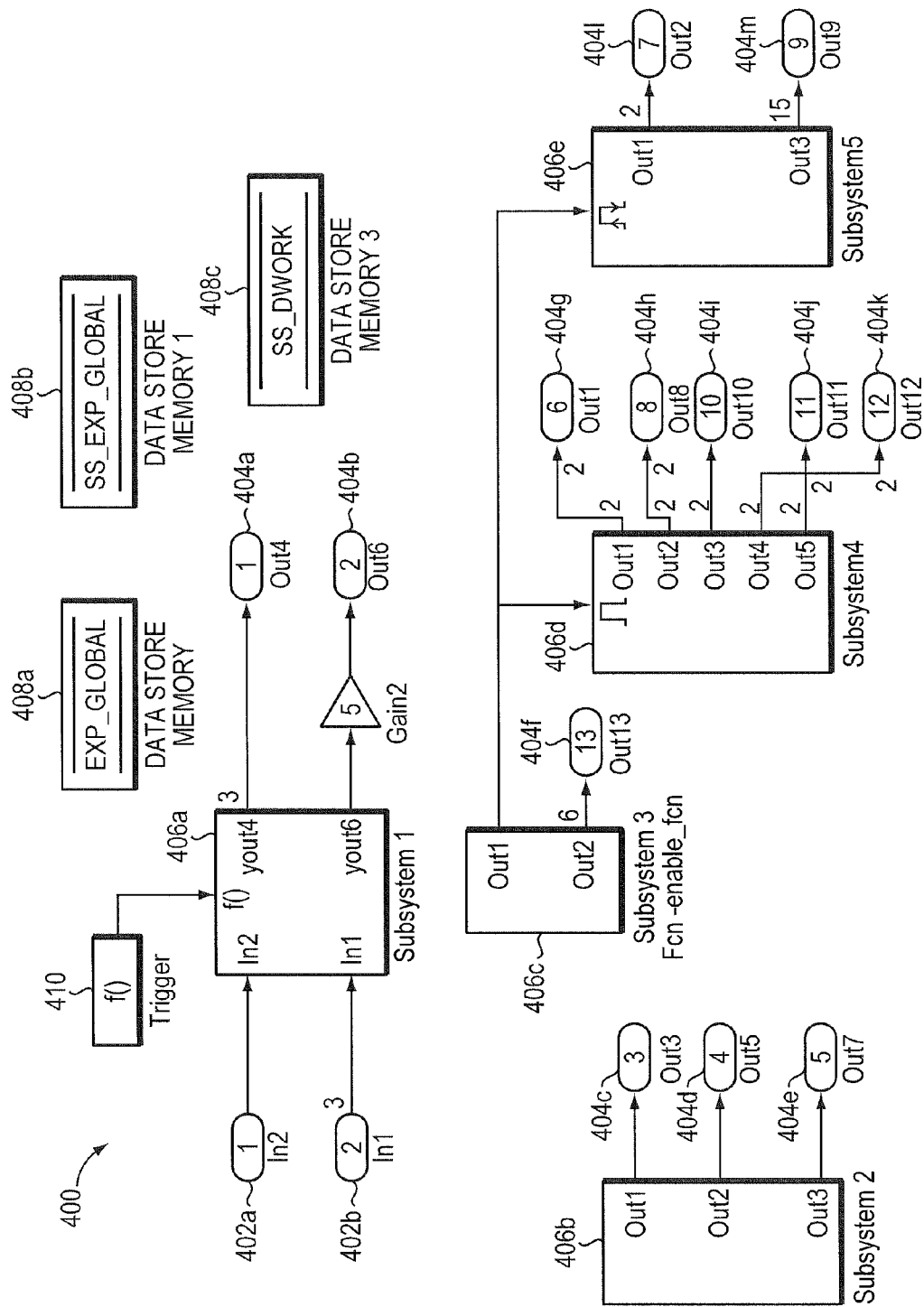
FIG. 4 is an illustration of an exemplary graphical model.

FIG. 4 is a schematic illustration of an exemplary executable, graphical model 400 that can be used with the present invention. The graphical model 400, which is in the form of a block diagram, includes a plurality of graphical objects, e.g., blocks, interconnected by lines, such as arrows. In particular, the model 400 includes two Inport blocks 402a, 402b, and thirteen Outport blocks 404a-404m. The model 400 further includes five subsystem blocks: subsystem1 406a, subsystem2 406b, subsystem3 406c, subsystem4 406d, and subsystem5 406e. The model 400 also includes three data store memories 408a-c. The first subsystem block 406a may be a function-call subsystem. As a result, a Function-Call Generator block 410 may be connected to the first subsystem block 406a. The subsystem4 block 406d may be an enabled subsystem, and the subsystem5 block 406e may be a triggered subsystem. Each subsystem block 406 may represent a plurality of blocks at a lower level of model hierarchy.

A subsystem may be a set of blocks that have been replaced by a single block, referred to as a subsystem block. By using subsystem blocks, a user can reduce the amount of space needed to display a model. Subsystems establish hierarchy within the model, where the subsystem block is on one layer or level of the model hierarchy, and the blocks that make up the subsystem are on a next lower layer or level. In addition, a subsystem can be saved and re-used in other models or in other subsystems. Subsystem blocks provide a way to modularize and encapsulate multiple blocks within a model or within another subsystem. A subsystem may be executed conditionally or unconditionally. A subsystem may be virtual such that the execution of the blocks that make up the subsystem may be interspersed with the execution of other blocks of the model, such as other blocks that are at the same level of hierarchy as the virtual subsystem. A subsystem may be nonvirtual, e.g., atomic, such that the execution of the blocks that make up the atomic or nonvirtual subsystem may not be interspersed with the execution of other blocks of the model. That is, the blocks of an atomic or nonvirtual subsystem are executed as a single unit. A subsystem may be declared atomic or nonvirtual, for example by setting an option for the subsystem. For conditionally executed subsystems, execution depends on a control signal or control block. Examples of conditionally executed subsystems include triggered, enabled, action and iterator, triggered and enabled, and function call. A subsystem may be configured to prevent or allow certain characteristics (e.g., sample time, data type, width) of input, output, and/or internal variables and/or signals to be inferred from the characteristics of input, output, and/or internal variables and/or signals of other blocks of the model that are connected to the subsystem.

Figure 5:
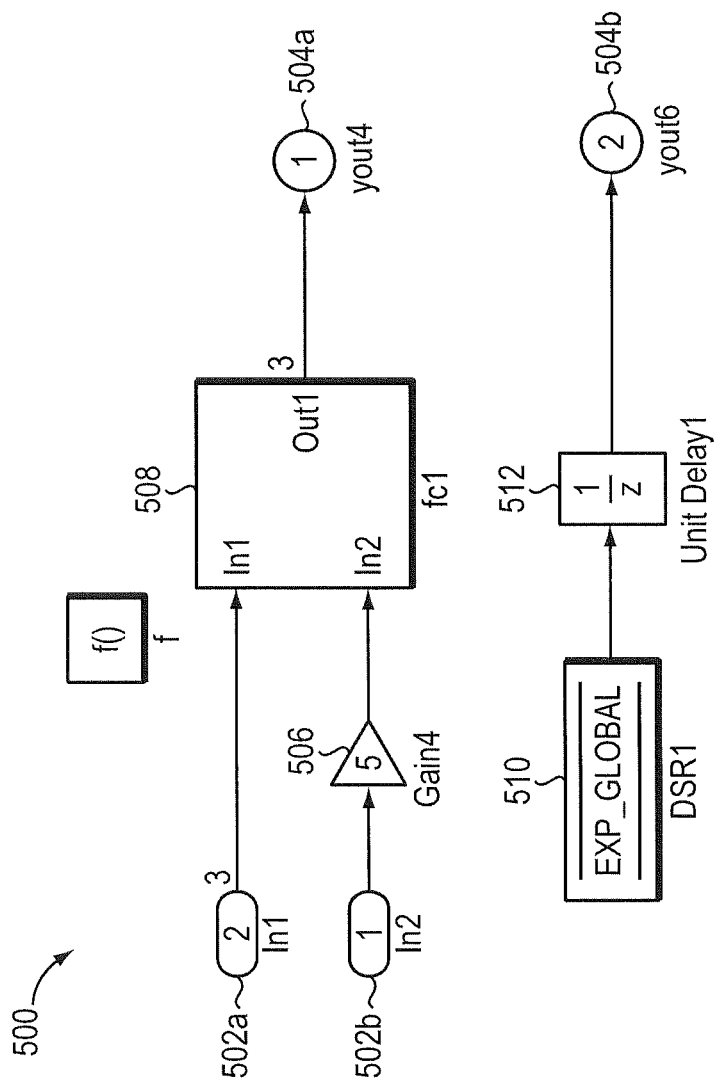
FIG. 5 is an illustration of a portion of the graphical model of FIG. 4.

FIG. 5, for example, is a schematic illustration of a subsystem 500 represented by the subsystem1 block 406a of the model 400. The subsystem 500 has two Inport blocks 502a, 502b, and two Outport blocks 504a, 504b. The subsystem 500 further includes a Gain block 506 and a subsystem block 508 labeled "fc1". The subsystem 500 further includes a Data Store Read block 510, and a Unit Delay block 512.

Figure 6:
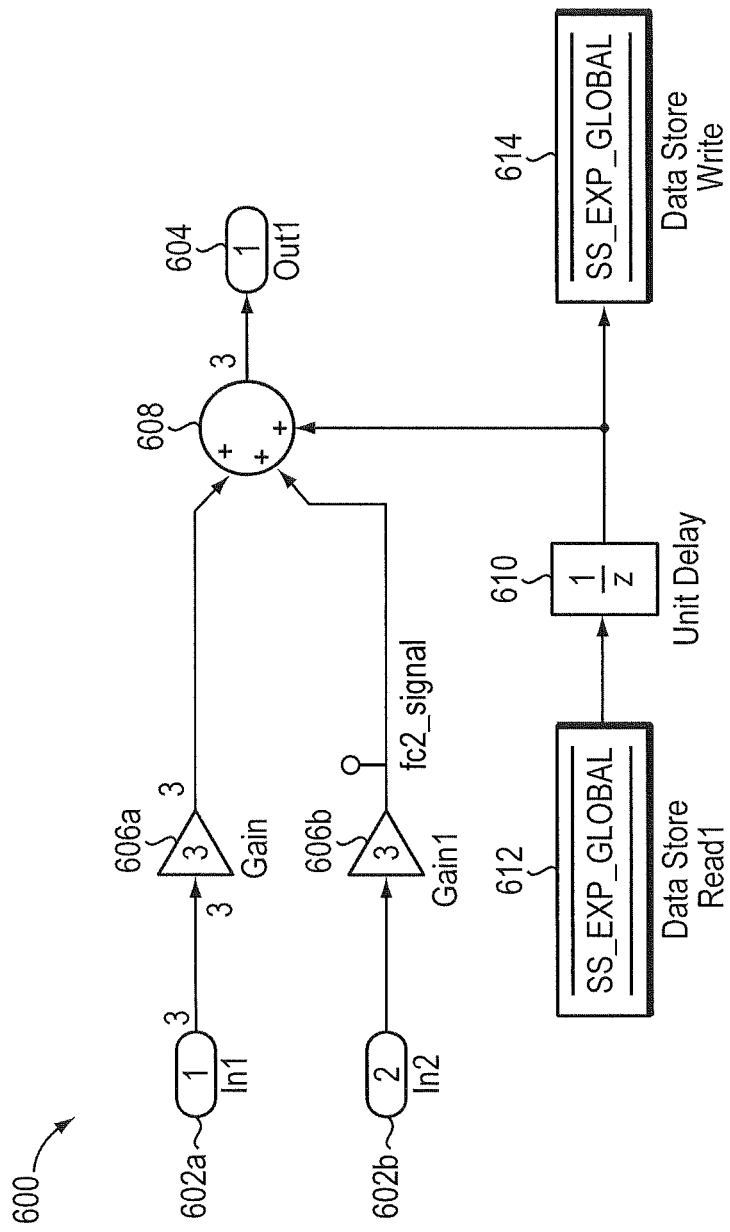
FIG. 6 is an illustration of a portion of the graphical model of FIG. 4.

FIG. 6 is a schematic illustration of a subsystem 600 represented by the fc1 subsystem block 508 of FIG. 5. The subsystem 600 includes two Inport blocks 602a, 602b, and one Outport block 604. The subsystem 600 further includes two Gain blocks 606a, 606b, a Sum block 608, and a Unit Delay block 610. In addition, the subsystem 600 includes a Data Store Read block 612, and a Data Store Write block 614.

The relationship represented by the connections, for example, the arrows, of the graphical model 400 may depend on the kind or type of model or model components. For example, for time-based modeling components, an arrow may represent a mathematical relationship between two connected blocks where a first block writes a signal, and a second block reads the signal. In other modeling environments, the arrows or lines may represent data flow, control flow, events, mechanical relationships, etc.

FIG. 7 is a schematic illustration of a data structure 700 for storing meta-data. The data-structure 700 may be configured as a table having a plurality of columns and rows whose intersections define cells or records for storing data. The meta-data table 700 may be organized into sections, such as an Input section 702, an Output section 704, and a Data Stores section 706. The Input section 702 may have a Graphical Input column 708, a Data type column 710, a Data width column 712, a Block Path column 714 and a Function Input column 716. The Input section 702 also may have one or more rows, such as rows 718*a-d*, for the graphical input of the model 400. In particular, for each row 718, the argument name of the graphical input may be stored at the respective cell of the Graphical Input column 708. The data type and the data width of the graphical input may be stored at the respective cells of the Data type column 710 and the Data width column 712. Exemplary data types include double-precision floating point (double or real_T), signed 32-bit integer (int32), etc. Width may refer to the number of elements that a signal contains. A path, starting from the top-level model, for the graphical input may be stored at the respective cell of the Block Path column 714. The name or symbol of the function input within the generated code that corresponds to the graphical input for this row may be stored in the cell corresponding to the Function Input column 716.

The Output section 704 may have a Graphical Output column 720, a Data type column 722, a Data width column 724, a Block Path column 726 and a Function Output column 728. The Output section 704 also may have one or more rows, such as rows 730*a*, 730*b*, for the graphical output of the model 400. In particular, for each row 730, the argument name of the graphical output may be stored at the respective cell of the Graphical Output column 720. The data type and the data width of the graphical output may be stored at the respective cells of the Data type column 722 and the Data width column 724. A path, starting from the top-level model, for the graphical output may be stored at the respective cell of the Block Path column 726. The name or symbol of the function output within the generated code that corresponds to the graphical output for this row may be stored in the cell corresponding to the Function Output column 728.

The Data Stores section 706 may have a Graphical Data Stores column 732, a Data type column 734, a Data width column 736, a Block Path column 738 and a Function Data Stores column 740. The Data Stores section 706 also may have one or more rows, such as row 742, for the data stores of the model 400. In particular, for each row, the argument name of the data store in the graphical model may be stored at the respective cell of the Graphical Data Stores column 732. The data type and the data width of the data store in the graphical model may be stored at the respective cells of the Data type column 734 and the Data width column 736. A path, starting from the top-level model, for the data store in the graphical model may be stored at the respective cell of the Block Path column 738. The name or symbol of the data store within the generated code that corresponds to the data store of the graphical model for this row may be stored in the cell corresponding to the Function Data Stores column 740.

It should be understood that the meta-data may include other information. For example, the meta-data may include the names of the one or more functions within the code that are generated for the subsystem, the execution semantics of the subsystem, such as the sample time or time steps at which the subsystem executes to the extent the graphical model is a time-based executable model, whether the subsystem is executed in response to a trigger, etc., and the names of one or more other functions within the generated code on which the one or more functions depend.

FIG. 8 is a partial listing of source code 800 generated for the top-level of the model 400. The generated code 800 may be included in a model.c file generated for the top-level of the model 400, and may include a plurality of numbered lines of code. At entry 802, the generated code includes a function call to a function identified as Subsystem1( ) at line 160. The Subsystem1( ) function corresponds to a function generated for the subsystem1 block 406*a* of the model 400 (FIG. 4). At entries 804, 806, the generated code 800 further includes function calls to the functions Subsystem2( ) at line 173, which corresponds to the Subsystem2 block 406*b* of the model 400, and enable_fcn( ) at line 184, which corresponds to the Subsystem3 block 406*c* of the model 400. At entries 808, 810, the generated code 800 also includes function calls to the functions Subsystem4( ) at line 191, which corresponds to the Subsystem4 block 406*d* of the model, and Subsystem5( ) at line 202, which corresponds to the Subsystem5 block 406*e* of the model 400.

The top-level model 400 includes the following graphical Input/Output (IO):

two Inport blocks 402*a*, 402*b* connected by respective arrows to the Subsystem1 block 406*a*;

two Outport blocks 404*a*, 404*b* connected by respective arrows to the Subsystem1 block 406*a*;

three Outport blocks 404*c-e* connected by respective arrows to the Subsystem2 block 406*b*;

one Outport block 404*f* connected by a respective arrow to the Subsystem3 block 406*c*;

five Outport blocks 404*g-k* connected by respective arrows to the Subsystem4 block 406*d*; and two Outport blocks 404*l*, 404*m* connected by respective arrows to the Subsystem5 block 406.

The function IO represented in the generated code, however, is different. For example, in the generated code the single arrow connecting the Subsystem1 block 406*a* to the Outport block 404*a*, which is associated with three data elements (as indicated by the number 3 adjacent to the arrow), is represented in the generated code by three separate lines of code. Specifically, the generated code 800 includes code entries 812, 814, 816 (corresponding to lines 163-165). The Outport block 404*b* and its respective arrow are represented in the generated code 800 at code entry 818, which is at line 170. However, there are no lines in the generated code for the top level model that correspond to the Outport blocks 404*d* and its respective arrow.

FIG. 9 is a listing of source code 900 generated for the subsystem1 block 406*a* of the graphical model 400, which is shown at subsystem 500 (FIG. 5). The generated code 900 may be included in a subsystem1.c file generated for the subsystem 500, and may include a plurality of numbered lines of code. At entry 902, the generated code 900 includes a function call to a function identified as fc1( ) at lines 69-70.

As shown in FIG. 5, subsystem 500 includes the following graphical IO:
two Inport blocks 502a, 502b; and
two Outport blocks 504a, 504b.

The function IO of the generated code 900, however, is different. While entry 904 of the generated code 900, which is line 66, generally corresponds to graphical Inport block 502a, there is no entry within the generated code 900 for subsystem 500 corresponding to Inport block 502b. Furthermore, there are no entries within the generated code 900 for either of the two Outport blocks 504a, 504b. In addition, the generated code 900 includes function IO that has no corresponding counterpart in the graphical IO. For example, the generated code 900 includes an entry 906, i.e., line 81, for a data store read.

FIG. 10 is a listing of source code 1000 generated for the subsystem block 508 (FIG. 5), which is shown at subsystem 600 (FIG. 6). The generated code 1000 may be included in a subsystem1.c file, and may include a plurality of numbered lines of code.

As shown in FIG. 6, subsystem 600 includes the following graphical IO:
two Inport blocks 602a, 602b; and
one Outport block 604.

The function IO of the generated code 1000 is different. The generated code 1000 includes three function inputs, rtu_In1[0], rtu_In1[0], and rtu_In1[0] for the single Inport block 602. These three function inputs appear in entry 1002 at lines 44-49, which perform the sum operation of Sum block 608. Similarly, for the single Outport block 604, the generated code has three function outputs, localB→Sum[0], localB→Sum[1], and localB→Sum[3]. These three function outputs also appear at entry 1002. The second Inport block 602b corresponds to function input rtu_In2 at entry 1004 at line 38.

Suppose a user wants to perform contextual verification of a portion of the generated code for the model 400. In particular, suppose that the user wants to perform contextual verification of subsystem1 of the graphical model 400, which corresponds to subsystem block 406c, and is illustrated in FIG. 5. In an embodiment, when a user selects a unit from the model for functional testing, the selected unit and all units within the selected unit are executed through the generated code. Accordingly, as subsystem fc1, which corresponds to subsystem block 508, is within subsystem1, contextual verification of subsystem fc1 is also performed.

In an embodiment, while a unit may be selected for functional testing, one or more units within the selected unit may still be executed in interpreted mode. For example, a user may designate one or more units within the selected unit to be executed by the simulation engine 206, as opposed to being executed by compiling and executing the generated code.

FIG. 11 is a schematic illustration of interface code 1100 generated for the portion of generated code corresponding to the subsystem block 406a, also identified as Subsystem1. The interface code 1100 may include a comment or API section 1102 and a code section 1104. The comment section 1102 may include at least a portion of the meta-data for the subsystem block 406a. In particular, the meta-data within the comment section 1102 may include a first portion 1106 that includes meta-data for translating graphical input to function input, a second portion 1108 that includes meta-data for translating function output to graphical output, and a third portion 1110 for translating one or more data store memories between the graphical and function domains.

The code section 1104 may include executable statements that translate graphical input to function input, call one or more functions, translate function output to graphical output, and translate between graphical and function data memory stores. In particular, the code section 1104 may include an entry 1112, which corresponds to lines 95-97, that defines memory locations for the graphic IO and function IO. The code section 1104 may further include one or more statements, such as statements 1114 and 1116, that copy data values from memory locations defined for the graphical input to memory locations defined for the function input. The code section 1104 also may include one or more statements, such as statements 1118 and 1120, that copy data values from memory locations defined for graphical data memory store reads to locations defined for function data memory store reads. The code section may also include one or more function calls, such as entry 1122, for calling functions within the generated code, such as the Subsystem1( ) function.

The code section 1104 may further include one or more statements, such as statements 1124 and 1126, that copy data values from memory locations defined for the function output to memory locations defined for the graphical output. The code section 1104 also may include one or more statements, such as statements 1128 and 1130, that copy data values from memory locations defined for function data memory store writes to locations defined for graphical data memory store writes.

Because subsystem fc1 is within subsystem1, interface code is also generated for subsystem fc1. FIG. 12 is a schematic illustration of interface code 1200 generated for subsystem fc1. The interface code 1200 may include a comment or API section 1202 and a code section 1204. The comment section 1202 may include at least a portion of the meta-data for the subsystem block 508. In particular, the meta-data within the comment section 1202 may include a first portion 1206 that includes meta-data for translating graphical input to function input, a second portion 1208 that includes meta-data for translating function output to graphical output, and a third portion 1210 that includes meta-data for translating one or more data store memories between the graphical and function domains.

The code section 1204 may include executable statements that translate graphical input to function input, call one or more functions, translate function output to graphical output, and translate between graphical and function data memory stores. In particular, the code section 1204 may include an entry 1212, which corresponds to lines 180-181, that defines memory locations for the graphic IO and function IO. The code section 1204 may further include one or more statements that copy data values from memory locations defined for the graphical input to memory locations defined for the function input. The code section 1204 also may include one or more statements, such as statement 1214, that copy data values from memory locations defined for graphical data memory store reads to locations defined for function data store reads. The code section 1204 may also include one or more function calls, such as entry 1216, for calling functions within the generated code, such as the fc1( ) function. The code section 1204 may further include one or more statements, such as statement 1218, that copy data values from memory locations defined for the function output to memory locations defined for the graphical output. The code section 1204 also may include one or more statements, such as statement 1220, that copy data values from memory locations defined for function data memory store writes to locations defined for graphical data memory store writes.

During execution of the model 400 by the simulation engine 206, each time execution reaches subsystem1 406a, execution of the graphical model 400 by the simulation engine 206 may be suspended. The bypass engine 226 locates the interface code for subsystem1 406a, for example, interface code 1100. The interface code 1100 may be compiled by the target language compiler 220 and executed. Execution of the interface code 1100 results in only a portion of the code that was generated for the model 400 being executed. In particular, the portion of the generated code for subsystem1 406a executed. Because subsystem fc1 508 is within subsystem1 406a, the bypass engine 226 also locates the interface code for subsystem fc1 508, for example, interface code 1200. The interface code 1200 may be compiled by the target language compiler 220 and executed. The graphical input for subsystem1 406a is written to the memory locations defined in the interface code 1100, 1200, and the values stored at these memory locations are read during execution of the portion of the generated code for subsystem1 406a.

Execution of the interface code 1100 and 1200 results in only the portion of the generated code for subsystem1 406a being executed. The function output generated by executing the portion of generated code for subsystem1 406a is written to the memory locations defined in the interface code 1100, 1200. After the portion of the generated code for subsystem1 406a is executed, execution of the graphical model 400 continues by the simulation engine 206. The simulation engine 206 utilizes the values written to the memory locations for the function output as inputs to other parts of the model 400 during further execution of the graphical model 400.

It should be understood that a unit designated for functional testing may be located within a sub-model block of the top-level model.

It should also be understood that a user may request the creation of interface code during the code generation process for the model, or at a time subsequent to the generation of code for the model.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in addition to or instead of executable graphical models, the invention may be used with graphical models having executable semantics, such as models created using Architecture Analysis and Design Language (AADL), Uniform Modeling Language (UML), and/or SysML tools. In addition, the generated code may include fixed-point code to run on a fixed-point processor, or code to emulate fixed-point behavior on a floating-point processor. Therefore, it is the object of the appended claims to cover all such variations and modifications as come within the true spirit and scope of the invention.

What is claimed is:

1. A non-transitory computer-readable medium comprising program instructions, the program instructions when executed by a processing element operable to:
   receive a graphical model having executable semantics, the graphical model including a plurality of graphical objects;
   generate standalone code for the graphical model, the generated standalone code
      including a portion that corresponds to a given graphical object of the graphical model, and
      lacking a callable interface for the portion that corresponds to the given graphical object of the graphical model;
   identify, by a processor, the portion of the generated code that corresponds to the given graphical object of the graphical model;
   construct an interface to the portion of the generated standalone code that corresponds to the given graphical object of the graphical model; and
   execute the graphical model in an interpreted mode such that:
      execution of the given graphical object of the graphical model is bypassed, and
      the portion of the generated code that corresponds to the given graphical object of the graphical model is executed in place of the given graphical object of the graphical model utilizing the constructed interface.

2. The computer-readable medium of claim 1 wherein execution of the graphical model produces one or more model results,
   execution of the generated code produces one or more code results, and
   the one or more code results are equivalent to the one or more model results.

3. The computer-readable medium of claim 1 wherein the portion of the generated code corresponding to the given graphical object does not support standalone execution.

4. The computer-readable medium of claim 1 wherein less than all of the generated code is executed.

5. The computer-readable medium of claim 1 wherein the graphical model defines a context for the given graphical object, the program instructions when executed by the processing element further operable to:
   generate contextual code for executing the portion of the generated code in the context defined within the graphical model for the given graphical object.

6. The computer-readable medium of claim 1 where the generated code is executed in either a compiled mode or an interpreted mode.

7. A method comprising:
receiving a graphical model having executable semantics, the graphical model including a graphical object that has a context defined within the graphical model;
generating standalone code for the graphical model as a whole, the generated code
including a portion that corresponds to the graphical object of the graphical model, and
lacking a callable interface for the portion that corresponds to the graphical object of the graphical model;
constructing an interface to the portion of the generated standalone code that corresponds to the graphical object of the graphical model; and
executing, by a processor, the graphical model, the executing including:
bypassing execution of the graphical object during execution of the graphical model, and
executing the portion of the generated code within the context defined within the graphical model for the graphical object using the interface.

8. A non-transitory computer-readable medium comprising program instructions, the program instructions when executed by a processing element operable to:
receive a graphical model having executable semantics, the graphical model including a plurality of graphical objects;
generate first standalone code for the graphical model according to a first code generation setting, the first generated code
being semantically equivalent to the graphical model, and
including a portion that corresponds to a given graphical object of the graphical model;
generate second standalone code for the graphical model according to a second code generation setting, the second generated code
being semantically equivalent to the graphical model,
including a portion that corresponds to the given graphical object of the graphical model, and
lacking a callable interface for the portion of the generated second standalone code that corresponds to the given graphical object of the graphical model, where the second generated code is different from the first generated code;
construct contextual code for the portion of the generated second standalone code that corresponds to the given graphical object of the graphical model; and
execute, by a processor, the first standalone code, where the execution of the first standalone code includes:
bypassing the portion of the first standalone code that corresponds to the given graphical object of the graphical model, and
executing the portion of the second standalone code that corresponds to the given graphical object of the graphical model using the contextual code.

9. The computer-readable medium of claim 8 wherein
the first code generation setting is a normal setting, and
the second code generation setting is an instrumented setting.

10. A non-transitory computer-readable medium comprising program instructions, the program instructions when executed by a processing element operable to:
receive a graphical model having executable semantics, the graphical model including a subsystem that has a context defined within the graphical model;
generate standalone code for the graphical model, the generated standalone code
including one or more functions that implement the subsystem of the graphical model, and
lacking a callable interface to the one or more functions that implement the subsystem of the graphical model;
generate an interface to the one or more functions of the generated standalone code that implement the subsystem of the graphical model; and
execute, by a processor, the graphical model in an interpreted mode, where the execution of the graphical model includes:
bypassing execution of the subsystem of the graphical model, and
using the interface to call the one or more functions of the generated code in the context defined within the graphical model for the subsystem.

11. A method comprising:
storing a graphical model having executable semantics in a memory, the graphical model including a plurality of graphical objects;
generating standalone code for the graphical model, the generated standalone code
including a portion that corresponds to a given graphical object of the graphical model, and
lacking a callable interface for the portion that corresponds to the given graphical object of the graphical model;
identifying the portion of the generated code that corresponds to the given graphical object of the graphical model;
constructing, by a processor coupled to the memory, an interface to the portion of the generated standalone code that corresponds to the given graphical object of the graphical model; and
executing the graphical model in an interpreted mode such that:
execution of the given graphical object of the graphical model is bypassed, and
the portion of the generated code that corresponds to the given graphical object of the graphical model is executed in place of the given graphical object of the graphical model utilizing the constructed interface.

12. The method of claim 11 wherein
execution of the graphical produces one or more model results,
execution of the generated code produces one or more code results, and
the one or more code results are equivalent to the one or more model results.

13. The method of claim 11 wherein the portion of the generated code corresponding to the given graphical object does not support standalone execution.

14. The method of claim 11 wherein less than all of the generated code is executed.

15. The method of claim 11 wherein the graphical model defines a context for the given graphical object, the method further comprising:
generating contextual code for executing the portion of the generated code in the context defined within the graphical model for the given graphical object.

16. The method of claim 11 where the generated code is executed in either a compiled mode or an interpreted mode.

17. An apparatus comprising:
a memory configured to store a graphical model having executable semantics, the graphical model including a plurality of graphical objects; and
a processor coupled to the memory, the processor configured to:

generate standalone code for the graphical model, the
generated standalone code
including a portion that corresponds to a given graphical object of the graphical model, and
lacking a callable interface for the portion that corresponds to the given graphical object of the graphical model;
identify the portion of the generated code that corresponds to the given graphical object of the graphical model;
construct an interface to the portion of the generated standalone code that corresponds to the given graphical object of the graphical model; and
execute the graphical model in an interpreted mode such that:
execution of the given graphical object of the graphical model is bypassed, and
the portion of the generated code that corresponds to the given graphical object of the graphical model is executed in place of the given graphical object of the graphical model utilizing the constructed interface.

18. The apparatus of claim 17 wherein
execution of the graphical model produces one or more model results,
execution of the generated code produces one or more code results, and
the one or more code results are equivalent to the one or more model results.

19. The apparatus of claim 17 wherein the portion of the generated code corresponding to the given graphical object does not support standalone execution.

20. The apparatus of claim 17 wherein less than all of the generated code is executed.

21. The apparatus of claim 17 wherein the graphical model defines a context for the given graphical object, the processor further configured to:
generate contextual code for executing the portion of the generated code in the context defined within the graphical model for the given graphical object.

22. The apparatus of claim 17 where the generated code is executed in either a compiled mode or an interpreted mode.

23. A non-transitory computer-readable medium comprising program instructions, the program instructions when executed by a processing element operable to:
receive, at a memory, a graphical model having executable semantics, the graphical model including a graphical object that has a context defined within the graphical model;
generate standalone code for the graphical model as a whole, the generated code
including a portion that corresponds to the graphical object of the graphical model, and
lacking a callable interface for the portion that corresponds to the graphical object of the graphical model;
construct, by a processor coupled to the memory, an interface to the portion of the generated standalone code that corresponds to the graphical object of the graphical model; and
execute the graphical model, the executing including:
bypassing execution of the graphical object during execution of the graphical model, and
executing the portion of the generated code within the context defined within the graphical model for the graphical object using the interface.

24. A method comprising:
receiving a graphical model having executable semantics, at a memory, the graphical model including a plurality of graphical objects;
generating first standalone code for the graphical model according to a first code generation setting, the first generated code
being semantically equivalent to the graphical model, and
including a portion that corresponds to a given graphical object of the graphical model;
generating second standalone code for the graphical model according to a second code generation setting, the second generated code
being semantically equivalent to the graphical model,
including a portion that corresponds to the given graphical object of the graphical model, and
lacking a callable interface for the portion of the generated second standalone code that corresponds to the given graphical object of the graphical model, where the second generated code is different from the first generated code;
constructing, by a processor coupled to the memory, contextual code for the portion of the generated second standalone code that corresponds to the given graphical object of the graphical model; and
executing the first standalone code, where the execution of the first standalone code includes:
bypassing the portion of the first standalone code that corresponds to the given graphical object of the graphical model, and
executing the portion of the second standalone code that corresponds to the given graphical object of the graphical model using the contextual code.

25. The method of claim 24 wherein
the first code generation setting is a normal setting, and
the second code generation setting is an instrumented setting.

26. A method comprising:
storing a graphical model having executable semantics, at a memory, the graphical model including a subsystem that has a context defined within the graphical model;
generating standalone code for the graphical model, the generated standalone code
including one or more functions that implement the subsystem of the graphical model, and
lacking a callable interface to the one or more functions that implement the subsystem of the graphical model;
generating, by a processor coupled to the memory, an interface to the one or more functions of the generated standalone code that implement the subsystem of the graphical model; and
executing the graphical model in an interpreted mode, where the execution of the graphical model includes:
bypassing execution of the subsystem of the graphical model, and
using the interface to call the one or more functions of the generated code in the context defined within the graphical model for the subsystem.

27. An apparatus comprising:
a memory configured to store a graphical model having executable semantics, the graphical model including a graphical object that has a context defined within the graphical model; and
a processor coupled to the memory, the processor configured to:

generate standalone code for the graphical model as a whole, the generated code
including a portion that corresponds to the graphical object of the graphical model, and
lacking a callable interface for the portion that corresponds to the graphical object of the graphical model;
construct an interface to the portion of the generated standalone code that corresponds to the graphical object of the graphical model; and
execute the graphical model, the executing including:
bypassing execution of the graphical object during execution of the graphical model, and
executing the portion of the generated code within the context defined within the graphical model for the graphical object using the interface.

28. An apparatus comprising:
a memory configured to store a graphical model having executable semantics, the graphical model including a plurality of graphical objects; and
a processor coupled to the memory, the processor configured to:
generate first standalone code for the graphical model according to a first code generation setting, the first generated code
being semantically equivalent to the graphical model, and
including a portion that corresponds to a given graphical object of the graphical model;
generate second standalone code for the graphical model according to a second code generation setting, the second generated code
being semantically equivalent to the graphical model, including a portion that corresponds to the given graphical object of the graphical model, and
lacking a callable interface for the portion of the generated second standalone code that corresponds to the given graphical object of the graphical model, where the second generated code is different from the first generated code;
construct contextual code for the portion of the generated second standalone code that corresponds to the given graphical object of the graphical model; and
executing the first standalone code, where the execution of the first standalone code includes:
bypassing the portion of the first standalone code that corresponds to the given graphical object of the graphical model, and
executing the portion of the second standalone code that corresponds to the given graphical object of the graphical model using the contextual code.

29. The apparatus of claim 28 wherein
the first code generation setting is a normal setting, and
the second code generation setting is an instrumented setting.

30. An apparatus comprising:
a memory configured to store a graphical model having executable semantics, the graphical model including a subsystem that has a context defined within the graphical model; and
a processor coupled to the memory, the processor configured to:
generate standalone code for the graphical model, the generated standalone code
including one or more functions that implement the subsystem of the graphical model, and
lacking a callable interface to the one or more functions that implement the subsystem of the graphical model;
generate an interface to the one or more functions of the generated standalone code that implement the subsystem of the graphical model; and
execute the graphical model in an interpreted mode, where the execution of the graphical model includes:
bypassing execution of the subsystem of the graphical model, and
using the interface to call the one or more functions of the generated code in the context defined within the graphical model for the subsystem.

* * * * *

UNITED STATES PATENT AND TRADEMARK OFFICE
CERTIFICATE OF CORRECTION

PATENT NO. : 8,972,931 B1
APPLICATION NO. : 13/285845
DATED : March 3, 2015
INVENTOR(S) : Aravind Pillarisetti Page 1 of 1

It is certified that error appears in the above-identified patent and that said Letters Patent is hereby corrected as shown below:

In the Specification:
Col. 17, line 8 should read:
406a is executed. Because subsystem fc1 508 is within sub- Signed and Sealed this
Thirtieth Day of June, 2015

Michelle K. Lee
*Director of the United States Patent and Trademark Office*